United States Patent [19]

Weidenbach et al.

[11] 3,895,093
[45] July 15, 1975

[54] CATALYTIC REMOVAL OF CARBON MONOXIDE, UNBURNED HYDROCARBONS AND NITROGEN OXIDES FROM AUTOMOTIVE EXHAUST GAS

[75] Inventors: Gunter Weidenbach, Anderten; Karl Hermann Koepernik, Hannover, both of Germany

[73] Assignee: Kali-Chemie Aktiengesellschaft, Hannover, Germany

[22] Filed: Jan. 31, 1974

[21] Appl. No.: 438,247

[30] Foreign Application Priority Data
  Feb. 1, 1973   Germany............................ 2304831

[52] U.S. Cl. ...................... 423/213.5; 252/466 PT
[51] Int. Cl. .............................................. B01d 53/34
[58] Field of Search ........ 423/213.5, 213.7; 60/301; 252/466

[56] References Cited
UNITED STATES PATENTS

| | | |
|---|---|---|
| 3,118,727 | 1/1964 | Cohn .................................. 423/239 |
| 3,370,914 | 2/1968 | Gross et al....................... 423/213.5 |
| 3,791,144 | 2/1974 | Lang............................. 423/213.5 X |
| 3,801,697 | 4/1974 | Kobylinski et al. ............... 423/213.7 |
| 3,806,582 | 4/1974 | Acres et al.......................... 423/239 |

FOREIGN PATENTS OR APPLICATIONS 873,326   6/1971   Canada

*Primary Examiner*—G. O. Peters
*Attorney, Agent, or Firm*—Richard L. Schwaab

[57]   ABSTRACT

Disclosed are a process and catalyst for catalytically removing carbon monoxide, incompletely burned hydrocarbons and nitrogen oxides from an automotive exhaust gas in a single stage catalytic converter. The ratio of fuel and air introduced to an engine is controlled in a particular manner and there is employed a catalyst which is capable of promoting the simultaneous oxidative conversion of 90% of the carbon monoxide and hydrocarbons and reductive conversion of at least 90% of the nitrogen oxides. A preferred catalyst is one comprising a mixture of platinum, ruthenium, rhodium and rhenium.

7 Claims, No Drawings

CATALYTIC REMOVAL OF CARBON MONOXIDE, UNBURNED HYDROCARBONS AND NITROGEN OXIDES FROM AUTOMOTIVE EXHAUST GAS

BACKGROUND OF THE INVENTION

The present invention relates to the catalytic purification of exhaust gases, and more especially to the catalytic elimination of hydrocarbons, carbon monoxide and nitrogen oxides in automotive exhaust gases with the use of a single catalyst in a so-called "single bed process" and to a particularly suited catalyst for this purpose.

For the decontamination of automobile exhaust gases there have been proposed systems which operate with two catalytic converters. In the first converter, the nitrogen oxides are reduced in the absence of oxygen, whereas air is introduced into the second catalytic bed and oxidation of the carbon monoxide and hydrocarbons takes place therein. See, for example, R. M. Campau, "Low Emission Concept Vehicles", S.A.E. Paper Sp 361 (1971) No. 710294.

The volume requirement for such an arrangement is, however, considerable so that in numerous types of vehicles the application of such a system would render necessary a substantial number of structural modifications, particularly since the catalytic converter cannot be installed in just any location of the exhaust system, but instead must be located in the immediate vicinity of the exhaust valve of the motor as a result of the high working temperature required for the catalyst.

It would therefore be desirable to have available a catalytic conversion system utilizing only a single converter unit wherein the hydrocarbons and carbon monoxide as well as the nitrogen oxides are removed from automotive exhaust gas.

SUMMARY OF THE INVENTION

It is therefore an object of the present invention to provide a process for catalytically removing carbon monoxide, incompletely burned hydrocarbons and nitrogen oxides from automotive exhaust gas utilizing only a single bed catalytic converter.

It is a further object of the present invention to provide a catalyst composition particularly suited for use in such a single bed process.

Another object of the present invention resides in the provision of a method for preparing a catalyst composition suitable for application in a single bed process for the catalytic elimination of hydrocarbons, carbon monoxide and nitrogen oxides from auto exhaust gases.

In accomplishing the foregoing objects, there has been provided in accordance with the present invention a process for catalytically removing carbon monoxide, incompletely burned hydrocarbons and nitrogen oxides from an automotive exhaust gas, comprising providing a nearly stoichiometric fuel-air ratio in the automotive engine feed to produce a q-value of between about 0.8 and 1.2 wherein $$q = \frac{(O_2) + 0.5\,(NO)}{0.5\,(CO) + 0.5\,(H_2) + \frac{6n+2}{4}(C_nH_{2n+2})}$$

and thereafter bringing said exhaust gas into contact with a single bed catalytic converter comprising a catalyst capable of promoting the simultaneous oxidative conversion of at least 90% of the carbon monoxide and hydrocarbons and the reductive conversion of at least 90% of the nitrogen oxides.

One suitable catalyst for use in this process comprises a high temperature carrier having distributed thereon a mixture of noble metals, especially, a mixture of platinum, ruthenium, rhodium and rhenium. The noble metals are present in the catalyst in an amount between about 0.01 and 0.5 %, preferably between about 0.05 and 0.2 % by weight, and the ratio of platinum, ruthenium, rhodium and rhenium is preferably between about 1:1:1:1 and 1:0.25:0.25:0.25. Preferably, the ratio of exposed platinum atoms to total platinum atoms is between about 0.75:1 and 1:1. Suitable high temperature carriers are aluminum oxides and aluminum silicate which have been calcined at a temperature between about 800° and 1500°C preferably between 900°C and 1150°C prior to application of the metallic catalyst components.

There is also provided in accordance with the present invention a process for the preparation of a catalyst suitable for catalytically removing carbon monoxide, incompletely burned hydrocarbons and nitrogen oxides from an automotive exhaust gas, comprising impregnating a high temperature resistant carrier with from about 0.01 to 0.5 % by weight of platinum, calcining the impregnated carrier between about 700° and 900°C., thereafter impregnating, either separately of concurrently the carrier with from about 0.01 to 0.5 % by weight each of ruthenium, rhodium and rhenium and again calcining the catalyst at an elevated temperature of between about 700° and 900°C. It is also advantageous to first saturate the high temperature resistant carrier with water prior to applying the catalytic metals.

Before use the finished catalyst is advantageously reduced for example, by exposure to a stream of hydrogen gas at 400° to 600°C. or an aqueous hydrazine hydrate solution.

Other objects, features and advantages of the present invention will become apparent from the detailed description of the invention which follows.

DETAILED DESCRIPTION OF THE INVENTION

It is known that if a nearly stoichiometric adjustment of the fuel-air ratio ($\lambda = 0.99 - 1.01$) is made, the exhaust gas resulting will contain only small amounts of carbon monoxide, hydrogen and unburned hydrocarbons, whereas the nitrogen oxide content is higher in comparison to a richer adjustment. Furthermore, such an exhaust gas also contains an amount of oxygen approximately equivalent to that of the unburned components. Since it is technically possible to adjust the fuel-air ratio in the stoichiometric region and to maintain this ratio constant under operating conditions, an exhaust gas nearly free of carbon monoxide, hydrocarbons and nitrogen oxides is obtained if the nitrogen oxides are converted to nitrogen with a portion of the hydrogen or carbon monoxide and at the same time the hydrocarbons as well as the remainder of the carbon monoxide are caused to react with the oxygen present. One system for maintaining the appropriate fuel-air mixture is described in SAE Report 73005 from the International Automotive Engineering Congress, Detroit, Mich., Jan. 8–12, 1973.

In principle, the contemplated system involves the following reactions:

1. $CO + 0.5\,O_2 \rightarrow CO_2$ (2)
$$C_nH_{2n+2} + \frac{6n+2}{4} O_2 \rightarrow nCO_2 + \frac{2n+2}{2} H_2O \quad \text{(for paraffinic hydrocarbons)}$$

3. $H_2 + 0.5\ O_2 \rightarrow H_2O$

4. $CO + NO \rightarrow CO_2 + 0.5\ N_2$

5. $H_2 + NO \rightarrow H_2O + 0.5\ N_2$

If the stoichiometric relationship of the oxidizing and reducing reaction participants is set equal to one, there results the following relationship (6) $$q = \frac{(O_2) + 0.5\ (NO)}{0.5\ (CO) + 0.5\ (H_2) + \frac{6n+2}{4}(C_nH_{2n+2})} = 1$$

wherein $(O_2)$, $(NO)$, $(CO)$, $(H_2)$ and $(C_nH_{2n+2})$ represent the content of $O_2$, $NO$, $CO$, $H_2$ and paraffinic hydrocarbons in the exhaust gas, and $n$ represents the number of carbon atoms in the paraffinic hydrocarbons. With a relationship of $q$ less than one, the reducing components of the system are in excess and with a relationship of $q$ greater than one, the oxidizing members are present in excess.

If the fuel-air ratio to an automotive 1 is held between 0.99 and 1.01 by means of an electronically controlled injection system, there results an exhaust gas which contains, inter alia, approximately 1% CO, 0.4% $H_2$, 0.02% $C_3H_8$ and 0.1% NO, whereas the $O_2$ content is between about 0.5 and 0.9%. If the variable oxygen content is inserted in equation 6 while holding the other reaction components constant, there is obtained for a value of $O_2$ equal to 0.5% a q-value of 0.69 and for an $O_2$ content of 0.9% a q-value of 1.19, whereas the stoichiometric relationship of $q = 1$ is attained at an $O_2$ content of 0.75%. The effectiveness of catalyst at variable q-values in the vicinity of $q=1$, i.e., $q$ varying from about 0.8 to 1.2, (corresponding to a stoichiometric exhaust gas composition) is determined in the following manner:

The degree of conversion of NO, CO and hydrocarbons in percent is graphically plotted with respect to q. The range of q within which the degree of conversion of the three specified exhaust gas components is above 90 % defines the criterion for the catalyst effectiveness and should be as large as possible (so called window).

There has now been discovered in accordance with the present invention a process for the catalytic removal of carbon monoxide, unburned hydrocarbons and nitrogen oxides from one or more exhaust gases in accordance with the foregoing principles. By maintaining a nearly stoichiometric relationship of the fuel-air mixture and providing a q-value between about 0.8 and 1.2, the contaminating components of the exhaust gas can be removed in a single catalytic converter stage by employing a catalyst which is capable of promoting the simultaneous oxidation of at least 90 % of the carbon monoxide and hydrocarbons and the reduction of at least 90 % of the nitrogen oxides in the particular mixture of gases present.

An especially suitable catalyst comprises up to about 0.5 weight percent of platinum in combination with similar amounts of ruthenium, rhodium and rhenium. Specially, the platinum, ruthenium, rhodium and rhenium content of the catalyst can be varied between about 0.01 and 0.5 weight percent of each metal, preferably between about 0.05 and 0.2 weight percent. Preferably, the ratio of platinum, ruthenium, rhodium and rhenium is within the range of about 1:1:1:1 and 1:0.25:0.25:0.25.

A preferred catalyst composition which is particularly effective for the intended purpose of use, especially with respect to the oxidation of carbon monoxide is obtained, if the platinum is distributed on the carrier so that the ratio of exposed platinum atoms to the total number of platinum atoms lies between about 0.75:1 and 1:1. This high degree of dispersion is achieved if the platinum is deposited on the carrier by means of impregnation of the carrier with an aqueous solution of platinum tetrammine hydroxide prior to application of rhodium, ruthenium and rhenium metals to the catalyst.

Impregnation of the carrier with ruthenium, rhodium and rhenium can be carried out either separately or simultaneously, and conventional solutions of various salts of these metals can be employed to introduce each onto the carrier. For example, in an alkaline solution the application of rhodium and ruthenium can be carried out either separately or together, containing rhodium advantageously as rhodium hexammine hydroxide and containing ruthenium as ruthenium hydroxo chloro tetrammine hydroxide. Alternately, in an acid solution the rhodium and ruthenium can be applied, either together or separately, containing rhodium as nitrate and/or ammonium hexachloro ruthenate. Impregnation with rhenium can likewise be conducted together with the rhodium and ruthenium or in a separate step, for example, in an acid solution containing ammonium perrhenate.

The temperature at which impregnation of the carrier with the various metallic components is carried out is not critical, and conventional procedures are employed. Preferably, all impregnation steps are conducted at or near the boiling temperature of the solution, although impregnation at room temperature is also possible, the only difference being that it requires more time.

It is also proved to be advantageous for the activity and stability of the catalyst, especially particulate catalysts, to saturate the carrier with water prior to impregnation with the noble metal solutions, i.e., prior to impregnation with the platinum solution in the preferred catalyst of the invention. This saturation with water may be carried out in any fashion and at any temperature between room temperature and the boiling temperature of the water.

After each impregnation step, it is necessary to calcine the impregnated catalyst carrier at a temperature between about 700° and 900°C., preferably at about 800°C. for a period of time between about 10 and 60 minutes. Preferably, the impregnated catalyst carrier is first dried at an elevated temperature, for example, between about 100° and 200°C. and most suitably at about 120°C. prior to the calcination treatment.

It has also been shown to be advantageous if the finished catalyst is reduced prior to its use. Reduction of the catalyst may be carried out in any conventional manner by contacting the catalyst with a suitable reducing agent. For example, reduction can be achieved by contacting the catalyst with a stream of hydrogen at an elevated temperature of about 400° to 600°C. or by contacting it with an aqueous solution containing a reducing agent, such as hydrazine hydrate and drying.

Suitable for the preparation of the platinum/ruthenium/rhodium/rhenium catalyst according to the present invention are carriers of high temperature resistant materials which have been prepared in the form of pellets extrudates or spheres of high heat resistance and abrasion resistance. Especially suitable carriers are comprised of aluminum oxides and/or aluminum silicates. It is also advantageous to maintain the content of sodium oxide below 0.1 % and the content of inorganic anions, such as chloride or sulfate anions, below about 0.2 %.

Prior to preparation of the catalyst, the carrier material is calcined for a period of about 10 to 120 minutes at a temperature between about 800°C. and 1500°C., more especially between about 900°C. and 1150°C. Other suitable carriers for use in accordance with the present invention are honeycomb structures of non-rusting non-scaling high quality steels which are coated with a layer of aluminum oxide, as well as honeycomb structures or other structures of corrugated ceramic which comprise heat resistant materials for example, cordierite, betaspodumene, mullite, alpha-$Al_2O_3$ or combinations thereof. These materials may optionally also be coated with a layer of aluminum oxide.

An especially suitable carrier consists of a honeycomb structure of a non-rusting, scale-free and highly heat resistant metal or metal alloy which is covered with an elastic priming layer of aluminum silicate, which priming layer itself carries a catalytically active layer. The catalytically active layer comprises a catalytically active carrier material and the above-named combination of platinum, ruthenium, rhodium and rhenium. The specific carrier structure is further described in detail in U.S. Pat. application Ser. No. 436,726, filed Jan. 25, 1974 (by Hans Braeutigam, Guenter Weidenbach and Karl Hermann Koepernik, the disclosure of which is hereby incorporated by reference.

The following examples are presented to more completely describe the present invention, it being understood that the examples are intended to be illustrative and not limitative.

EXAMPLE 1

An aluminum hydroxide which essentially consists of pseudo-boehmite with portions of amorphous hydroxide and which has a content of $Na_2O$ of 0.01 % and a content of anions of 0.02 % is dried, ground up, formed in a known manner into spheres of 2–4 mm. diameter and finally calcined for 15 minutes with a gradual rise in temperature in a rotary kiln at 1150°C. The spheres are saturated in the first step with water and are then treated for 3 hours at the boiling temperature with an aqueous solution of platinum tetrammine hydroxide containing so much platinum that the finished catalyst contains 0.075 weight percent platinum after drying at 120°C. and calcining at 800°C. for 30 minutes.

In the second step, the catalyst is impregnated with a solution of ruthenium hydroxo chloro tetrammine hydroxide having such a concentration that the amount of ruthenium taken up by the carrier following drying at 120°C. and calcining at 800°C. for 30 minutes amounts to 0.075 weight percent. In the third step, there results a treatment of the catalyst with a solution of rhodium (III)-nitrate containing sufficient rhodium so that the rhodium content based upon the final catalyst amounts to 0.075 weight percent after drying at 120°C. and calcining at 800°C. for 30 minutes.

The fourth step includes an impregnation with an ammonium perrhenate solution having such a concentration that the finished catalyst contains 0.075 weight percent of rhenium after drying at 120°C. and calcining at 800°C. for 30 minutes. All impregnation steps are carried out at the boiling point of the impregnation solution.

After reduction of the catalyst in a stream of hydrogen at 500°C., the finished catalyst No. 1 contains 0.075 weight percent each of platinum, ruthenium, rhodium and rhenium.

The preparation of catalyst No. 2 is carried out in the same manner except that the amount and concentration of the impregnating solutions are varied so that the finished catalyst No. 2 contains 0.15 weight percent platinum and 0.045 weight percent each of ruthenium, rhodium and rhenium.

EXAMPLE 2

The carrier described in Example 1 is saturated with water and treated for 3 hours at the boiling temperature with an aqueous solution of platinum tetrammine hydroxide which contains a sufficient amount of platinum so that the finished catalyst contains 0.075 weight percent platinum. The impregnated catalyst is dried at 120°C. and calcined at 800°C.

The catalyst is then impregnated with a solution of ammonium hexachloro ruthenate, rhodium nitrate and ammonium perrhenate having a concentration of ruthenium, rhodium and rhenium so that after drying at 120°C. and calcining at 800°C. the finished catalyst contains 0.075 weight percent each of the three metals. After reduction in a stream of hydrogen at 500°C., the finished catalyst No. 3 contains 0.075 % by weight each of platinum, ruthenium, rhodium and rhenium.

EXAMPLE 3

The process of Example 1 is repeated except that there is employed as the carrier an aluminum oxide having a $SiO_2$ content of 3 % which has been calcined for 20 minutes at a temperature between 980° and 1000°C. in a rotary kiln. The final catalyst No. 4 contains 0.075 weight percent each of platinum, ruthenium, rhodium and rhenium. Catalyst No. 5 is prepared in an analogous manner with the exception that the amount and concentration of the impregnation solutions are varied so that the finished catalyst No. 5 contains 0.15 % by weight of platinum and 0.045 % by weight each of ruthenium, rhodium and rhenium.

EXAMPLE 4

The carrier utilized in Example 3 is impregnated and treated as described in Example 2. The final catalyst No. 6 contains 0.075 % by weight each of platinum, ruthenium, rhodium and rhenium.

Instead of the carrier specified in Example 1, a honeycomb structure of a cordierite composition is employed which is coated with active aluminum oxide. The aluminum oxide contains 0.01 weight percent $Na_2O$ and 0.015 weight percent anions. Pre-treatment of the carrier, impregnation, drying, calcination and reduction is carried out as described for catalyst No. 1 in Example 1 so that the finished catalyst No. 7 contains 0.075 weight percent each of platinum, ruthenium, rhodium and rhenium.

The preparation of catalyst No. 8 is carried out according to the same process, and only the amount and concentration of the impregnating solution is varied so that the finished catalyst No. 8 contains 0.15 weight percent platinum and 0.045 weight percent each of ruthenium, rhodium and rhenium.

EXAMPLE 6

The preparation of catalyst No. 5 is repeated according to the method described in Example 2, whereby the carrier specified in Example 5 is employed. The finished catalyst No. 9 contains 0.075 weight percent each of platinum, ruthenium and rhenium.

EXAMPLE 7

In place of the carrier specified in Example 1, a honeycomb structure of highly calcined aluminum oxide is employed which is coated with a layer of active aluminum oxide. The aluminum oxide used for the coating contains 0.1 weight percent $Na_2O$ and 0.015 weight percent anions. The pre-treatment, impregnation, drying, calcination and reduction is carried out as described in Example 1 for catalyst No. 1, so that the finished catalyst No. 10 contains 0.075 weight percent each of platinum, ruthenium, rhodium and rhenium.

EXAMPLE 8

The preparation of catalyst No. 3 is repeated as described in Example 2, except that the carrier specified in Example 7 is employed. The finished catalyst No. 11 contains 0.075 weight percent each of platinum, ruthenium, rhodium and rhenium.

EXAMPLE 9

In place of the carrier specified in Example 1, a honeycomb structure of highly calcined aluminum oxide is employed. The pre-treatment, impregnation, drying, calcining and reduction is carried out as described in Example 1 for catalyst No. 1, so that the finished catalyst No. 12 contains 0.075 weight percent each of platinum, ruthenium, rhodium and rhenium.

EXAMPLE 10

A honeycomb-shaped structure is prepared from a non-rusting, non-scaling and thermally stable steel sheet having a thickness of 50 microns. The sheet, in a degreased and cleaned condition is dipped in a suspension comprising fibrous aluminum silicate in an aqueous, colloidal silicic acid solution. A commercially available product marketed by the Carborundum Corp. under the designation "Fiberfrax QF 180" is employed as the aluminum silicate suspension. After drying at 200°C., the structure is dipped into a suspension which comprises 20 % by weight of highly dispersed pseudoboehmite in water. After drying at 200°C. and calcining at 900°C. for 30 minutes, the carrier structure is treated with a solution of platinum tetrammine hydroxide containing so much platinum that the finished catalyst contains 0.05 weight percent platinum after drying at 120°C. and calcining at 800°C. for 30 minutes. This and the subsequent impregnations are carried out at the boiling point.

In the second step, the catalyst is impregnated with a solution of ruthenium hydroxo chloro tetrammine hydroxide containing so much ruthenium that after drying at 120°C. and calcining at 800°C. for 30 minutes, the catalyst contains 0.05 weight percent ruthenium. In the third step, the catalyst is treated with a solution of rhodium (III)-nitrate containing so much rhodium that the rhodium content of the finished catalyst is 0.05 weight percent after drying at 120°C. and calcining for 30 minutes at 800°C. The fourth step includes an impregnation with an ammonium perrhenate solution having such a concentration that the finished catalyst contains 0.5 weight percent rhenium after drying at 120°C. and calcining at 800°C. for 30 minutes.

After reduction at 500°C. with a hydrogen stream, the finished catalyst No. 13 contains 0.05 weight percent each of platinum, ruthenium, rhodium and rhenium.

EXAMPLE 11

In place of the carrier specified in Example 1, a honeycomb structure of non-rusting and non-scaling high quality alloy steel is employed which is coated with a priming layer of aluminum silicate fibers and a layer of aluminum oxide as described in Example 10. The aluminum oxide contains 0.01 weight percent $Na_2O$ and 0.015 weight percent anions. The pre-treatment, impregnation, drying, calcining and reduction are carried out in accordance with the procedure set forth in Example 1 for catalyst No. 1, so that the finished catalyst No. 14 contains 0.075 weight percent each of platinum, ruthenium, rhodium and rhenium.

EXAMPLE 12

To demonstrate that the efffectiveness of the catalyst in accordance with the present invention is dependent upon the degree of platinum dispersion on the carrier, a catalyst No. 15 is prepared which has the same chemical composition as catalyst No. 1 except that it possesses a lower ratio of exposed platinum atoms to total platinum atoms. In contradistinction to the procedure described in Example 1, the impregnation with platinum is accomplished by dipping the dry aluminum oxide pellets in a solution of hexachloro platinic acid having such a platinum concentration that the catalyst contains 0.075 % of platinum after drying at 120°C. and calcining at 800°C. for 30 minutes. The further preparation corresponds to the process set forth in Example 1 so that the finished catalyst No. 15 contains 0.075 weight percent each of platinum, ruthenium, rhodium and rhenium.

EXAMPLE 13

To demonstrate catalytic activity, the catalysts No. 1 through 15 prepared in accordance with Examples 1 through 12 are tested with a mixture of gases having a composition approaching an automotive exhaust gas resulting from a stoichiometrically adjusted air-fuel ratio. Catalysts No. 1 through 15 are tested in a fresh condition and catalysts No. 1 through 12, 14 and 15 are tested after 100 hours of thermal aging at 900°C. The gas composition contains

| 1 | Vol.-% | CO |
|---|---|---|
| 10 | " | $CO_2$ |
| 14 | " | $H_2O$ |
| 0.4 | " | $H_2$ |

```
0.02        "      C_3H_k
0.1         "      NO
0.5-0.9     "      O_2        (variable)
Balance            N_2
```

The oxygen content is varied between 0.5 and 0.9 volume percent. The results obtained with catalysts No. 1 through 12, 14 and 15 at a space velocity of 50,000 hr.−1 and a gas entrance temperature of 500°C. are set forth in Table 1. Table 1 also contains the value of platinum dispersion, F defined as follows:

$$F = \frac{\text{Exposed platinum atoms}}{\text{Total number of platinum atoms}}$$

F-values are measured according to an oxygen-chemisorption method, such as described by Weidenbach and Fuerst (Chem. Techn. 15, 589 (1963)).

It may be seen from the results that the catalysts prepared in accordance with the present invention reduce the NO−, CO− and hydrocarbon-content of automotive exhaust gases by at least 90% where the q-values of the exhaust gas are between 0.81 and 1.06, and the catalyst maintains this effectiveness even after 100 hours of aging at 900°C.

Contrariwise, the evaluation of catalyst No. 15 having a platinum dispersion of less than 0.75 shown an essentially lower effectiveness, especially regarding the conversion of carbon monoxide. This test also confirms the influence of the degree of metal dispersion on the effectiveness of the catalyst.

Catalyst No. 13 is tested after a heat shock test as well as in the fresh condition. Accordingly, the catalyst is alternately heated for 5 minutes by a hot gas stream at 850°C. and subsequently cooled in a similar time interval by contact with a cold air stream at 20°C. After 200 repetitions of this procedure, a new activity test is carried out.

After this, an aging test under engine operating conditions is carried out according to which the catalyst is exposed to a gas temperature between 700° and 800°C. at a space velocity of 50,000 hr.−1. The catalyst is again tested after 100 hours of running time.

The results are reproduced in Table 2. They show that the excellent activity of the catalyst according to the present invention is not diminished as a result of intensive alternating thermal stress or as a result of long aging at high temperatures.

TABLE 1

| | | | | Cat. - No. 1 | | | Cat. - No. 2 | | | Cat. - No. 3 | | | Cat. - No. 4 | | | Cat. - No. 5 | | |
|---|---|---|---|---|---|---|---|---|---|---|---|---|---|---|---|---|---|---|
| Pt. Dispersion | | | | F = 0.83 | | | F = 0.81 | | | F = 0.84 | | | F = 0.80 | | | F = 0.77 | | |
| Temp. °C | Sp. Vel. v/vh | O_2 % | q | NO | CO | CH | NO | CO | CH | NO | CO | CH | NO | CO | CH | NO | CO | CH |
| | | | | | | | | | Conversion in Percent | | | | | | | | | |
| 500 | 50000 | 0.50 | 0.68 | 100 | 86 | 85 | 100 | 84 | 85 | 100 | 86 | 85 | 99 | 86 | 84 | 99 | 85 | 84 |
| | | 0.60 | 0.81 | 100 | 90 | 90 | 100 | 90 | 91 | 100 | 90 | 90 | 99 | 91 | 89 | 99 | 91 | 89 |
| | | 0.65 | 0.88 | 100 | 92 | 91 | 100 | 91 | 92 | 100 | 91 | 90 | 99 | 93 | 90 | 99 | 93 | 90 |
| | | 0.70 | 0.94 | 100 | 97 | 91 | 100 | 95 | 92 | 100 | 95 | 91 | 99 | 97 | 90 | 99 | 97 | 90 |
| | | 0.75 | 1.00 | 96 | 99 | 92 | 94 | 96 | 92 | 94 | 97 | 91 | 93 | 99 | 91 | 94 | 99 | 91 |
| | | 0.80 | 1.06 | 75 | 100 | 92 | 72 | 99 | 92 | 76 | 100 | 92 | 72 | 100 | 91 | 73 | 100 | 91 |
| | | 0.90 | 1.19 | 55 | 100 | 92 | 54 | 99 | 92 | 57 | 100 | 92 | 50 | 100 | 91 | 52 | 100 | 91 |
| | after 100 hrs. aging at 900°C. | | | | | | | | | | | | | | | | | |
| 500 | 50000 | 0.50 | 0.68 | 100 | 89 | 82 | 100 | 87 | 81 | 100 | 87 | 84 | 99 | 87 | 83 | 99 | 84 | 83 |
| | | 0.60 | 0.81 | 100 | 92 | 89 | 100 | 90 | 88 | 100 | 90 | 90 | 99 | 82 | 89 | 99 | 92 | 89 |
| | | 0.65 | 0.88 | 100 | 95 | 90 | 100 | 91 | 90 | 100 | 92 | 91 | 99 | 93 | 89 | 99 | 94 | 91 |
| | | 0.70 | 0.94 | 100 | 98 | 90 | 99 | 95 | 90 | 100 | 95 | 91 | 98 | 97 | 90 | 99 | 97 | 91 |
| | | 0.75 | 1.00 | 90 | 99 | 91 | 91 | 98 | 91 | 95 | 97 | 91 | 91 | 99 | 90 | 93 | 99 | 92 |
| | | 0.80 | 1.06 | 74 | 100 | 91 | 74 | 99 | 91 | 77 | 100 | 91 | 73 | 100 | 91 | 74 | 100 | 92 |
| | | 0.90 | 1.19 | 55 | 100 | 91 | 52 | 100 | 91 | 55 | 100 | 92 | 50 | 100 | 91 | 51 | 100 | 92 |

| | | | | Cat. - No. 6 | | | Cat. - No. 7 | | | Cat. - No. 8 | | | Cat. - No. 9 | | | Cat. - No. 10 | | |
|---|---|---|---|---|---|---|---|---|---|---|---|---|---|---|---|---|---|---|
| Pt.-Dispersion | | | | F = 0.78 | | | F = 0.82 | | | F = 0.79 | | | F = 0.84 | | | F = 0.80 | | |
| Temp. °C | Sp. Vel. v/vh | O_2 % | q | NO | CO | CH | NO | CO | CH | NO | CO | CH | NO | CO | CH | NO | CO | CH |
| | | | | | | | | | Conversion in Percent | | | | | | | | | |
| 500 | 50000 | 0.50 | 0.68 | 100 | 86 | 84 | 100 | 86 | 86 | 100 | 85 | 86 | 100 | 85 | 87 | 100 | 88 | 86 |
| | | 0.60 | 0.81 | 100 | 91 | 90 | 100 | 90 | 90 | 100 | 94 | 90 | 100 | 90 | 91 | 100 | 92 | 89 |
| | | 0.65 | 0.88 | 100 | 94 | 90 | 100 | 92 | 91 | 100 | 99 | 90 | 100 | 93 | 91 | 100 | 93 | 90 |
| | | 0.70 | 0.94 | 100 | 97 | 90 | 100 | 96 | 91 | 100 | 99 | 91 | 100 | 96 | 92 | 100 | 98 | 90 |
| | | 0.75 | 1.00 | 95 | 100 | 91 | 96 | 99 | 92 | 90 | 100 | 92 | 93 | 99 | 92 | 90 | 100 | 91 |
| | | 0.80 | 1.06 | 71 | 100 | 92 | 75 | 100 | 92 | 60 | 100 | 92 | 74 | 100 | 92 | 69 | 100 | 91 |
| | | 0.90 | 1.19 | 53 | 100 | 92 | 55 | 100 | 92 | 49 | 100 | 92 | 52 | 100 | 92 | 43 | 100 | 91 |
| | after 100 hrs. aging at 900°C. | | | | | | | | | | | | | | | | | |
| 500 | 50000 | 0.50 | 0.68 | 100 | 85 | 83 | 100 | 89 | 84 | 100 | 88 | 85 | 100 | 84 | 85 | 100 | 86 | 85 |
| | | 0.60 | 0.81 | 100 | 92 | 89 | 100 | 92 | 89 | 100 | 90 | 90 | 100 | 92 | 89 | 100 | 90 | 90 |
| | | 0.65 | 0.88 | 99 | 95 | 90 | 100 | 95 | 90 | 100 | 92 | 90 | 100 | 95 | 90 | 100 | 92 | 90 |
| | | 0.70 | 0.94 | 99 | 97 | 90 | 100 | 98 | 90 | 100 | 96 | 90 | 100 | 97 | 90 | 100 | 94 | 91 |
| | | 0.75 | 1.00 | 93 | 99 | 90 | 90 | 99 | 91 | 93 | 98 | 91 | 91 | 99 | 91 | 91 | 98 | 91 |
| | | 0.80 | 1.06 | 72 | 100 | 91 | 74 | 100 | 91 | 81 | 99 | 91 | 76 | 99 | 91 | 72 | 99 | 91 |
| | | 0.90 | 1.19 | 51 | 100 | 91 | 60 | 100 | 91 | 64 | 99 | 91 | 57 | 100 | 92 | 48 | 99 | 91 |

| | | | | Cat. - No. 11 | | | Cat. - No. 12 | | | Cat. - No. 14 | | | Cat. - No. 15 | | |
|---|---|---|---|---|---|---|---|---|---|---|---|---|---|---|---|
| Pt.-Dispersion | | | | F = 0.78 | | | F = 0.75 | | | F = (not meas.) | | | F = 0.38 | | |
| Temp. °C | Sp. Vel. v/vh | O_2 % | q | NO | CO | CH | NO | CO | CH | NO | CO | CH | NO | CO | CH |
| | | | | | | | | Conversion in Percent | | | | | | | | |
| 500 | 50000 | 0.50 | 0.68 | 100 | 85 | 83 | 100 | 88 | 83 | 100 | 85 | 85 | 99 | 55 | 85 |
| | | 0.60 | 0.81 | 100 | 90 | 89 | 100 | 92 | 89 | 100 | 91 | 90 | 99 | 76 | 86 |
| | | 0.65 | 0.88 | 100 | 93 | 90 | 100 | 93 | 90 | 100 | 92 | 91 | 99 | 82 | 87 |
| | | 0.70 | 0.94 | 100 | 97 | 90 | 100 | 98 | 90 | 100 | 97 | 91 | 98 | 93 | 89 |
| | | 0.75 | 1.00 | 93 | 99 | 90 | 86 | 100 | 91 | 92 | 99 | 91 | 91 | 97 | 90 |
| | | 0.80 | 1.06 | 72 | 100 | 91 | 64 | 100 | 91 | 74 | 100 | 92 | 62 | 97 | 90 |
| | | 0.90 | 1.19 | 51 | 100 | 91 | 43 | 100 | 91 | 50 | 100 | 92 | 45 | 97 | 90 |

TABLE 1-Continued

| | | | | Cat. - No. 11 F = 0.78 | | | Cat. - No. 12 F = 0.75 | | | Cat. - No. 14 F = (not meas.) | | | Cat. - No. 15 F = 0.38 | | |
|---|---|---|---|---|---|---|---|---|---|---|---|---|---|---|---|
| Pt. Dispersion | | | | | | | | | | | | | | | |
| Temp. °C | Sp. Vel. v/vh | $O_2$ % | q | NO | CO | CH | NO | CO | CH | NO | CO | CH | NO | CO | CH |
| | | | | | | | | | Conversion in Percent | | | | | | |
| 500 | 50000 | after 100 hrs. aging at 900°C. | | | | | | | | | | | | | | |
| | | 0.50 | 0.68 | 100 | 86 | 82 | 100 | 89 | 84 | 100 | 86 | 84 | 99 | 54 | 84 |
| | | 0.60 | 0.81 | 100 | 91 | 89 | 100 | 92 | 88 | 100 | 92 | 89 | 99 | 78 | 85 |
| | | 0.65 | 0.88 | 100 | 93 | 90 | 100 | 93 | 90 | 100 | 94 | 90 | 99 | 82 | 89 |
| | | 0.70 | 0.94 | 100 | 97 | 90 | 99 | 97 | 90 | 100 | 97 | 90 | 98 | 91 | 90 |
| | | 0.75 | 1.00 | 95 | 99 | 90 | 83 | 99 | 91 | 93 | 99 | 90 | 90 | 96 | 90 |
| | | 0.80 | 1.06 | 76 | 99 | 90 | 65 | 100 | 91 | 72 | 99 | 91 | 65 | 97 | 90 |
| | | 0.90 | 1.19 | 52 | 100 | 91 | 44 | 100 | 91 | 51 | 100 | 91 | 43 | 97 | 90 |

CH = Hydrocarbon

TABLE 2

Catalyst No. 13

| | fresh | | | Aging 200 heat shocks | | | +100 hr. Eng. Cond. | | |
|---|---|---|---|---|---|---|---|---|---|
| $q = \dfrac{(O_2)+0.5(NO)}{0.5(CO)+0.5(H_2)+5(C_3H_8)}$ | NO Conv. % | CO | CH | NO Conv. % | CO | CH | NO Conv. 90 | CO | CH |
| 0.69 | 100 | 90 | 90 | 100 | 90 | 90 | 100 | 91 | 89 |
| 0.81 | 100 | 92 | 90 | 100 | 93 | 90 | 100 | 93 | 91 |
| 0.88 | 100 | 96 | 91 | 100 | 96 | 91 | 100 | 97 | 92 |
| 0.94 | 100 | 100 | 91 | 100 | 98 | 91 | 100 | 99 | 92 |
| 1.00 | 100 | 100 | 92 | 100 | 100 | 92 | 100 | 100 | 92 |
| 1.06 | 87 | 100 | 92 | 87 | 100 | 92 | 88 | 100 | 92 |
| 1.19 | 71 | 100 | 92 | 74 | 100 | 92 | 68 | 100 | 92 |

CH = Hydrocarbon

What is claimed is:

1. A process for catalytically removing carbon monoxide, incompletely burned hydrocarbons and nitrogen oxides from an automotive exhaust gas, having a q-value of between 0.8 and 1.2 wherein $$q = \frac{(O_2) + 0.5 \, (NO)}{0.5 \, (CO) + 0.5(H_2) + 6n+2 \, (C_nH_{2n+2})}$$

with ($O_2$), (NO), (CO), ($H_2$) and ($C_nH_{2n+2}$) representing the content of $O_2$, NO, CO, $H_2$ and paraffinic hydrocarbons in the exhaust gas and with n representing the number of carbon atoms in said paraffinic hydrocarbons, comprising bringing said exhaust gas into contact with a single bed catalytic converter at normal exhaust gas temperatures, said catalyst comprises a high temperature resistant carrier having distributed thereon a mixture from about 0.01–0,5% by weight each of platinum, ruthenium, rhodium and rhenium with the ratio of exposed platinum atoms to total platinum atoms being between about 0.75:1 and 1:1.

2. The process as defined by claim 1, wherein the ratio of platinum, ruthenium, rhodium and rhenium is between about 1:1:1:1 and 1:0.25:0.25:0.25.

3. The process as defined by claim 1, wherein said catalyst comprises a non rusting, scale-free, highly heat resistant metallic skeleton having thereon an elastic priming layer comprising aluminum silicate, an outer layer comprising a catalytically active alumina and 0.01 to 0.5 % by weight each of platinum, ruthenium, rhodium and rhenium distributed on said carrier material.

4. The process as defined by claim 1, wherein said catalyst comprises a heat resistant ceramic honeycomb structure having thereon a layer comprising a catalytically active alumina and 0.01 to 0.5 % by weight each of platinum, ruthenium, rhodium and rhenium distributed on said carrier material.

5. The process as defined by claim 1, wherein said catalyst comprises a particulate catalyst carrier consisting of catalytically active alumina or aluminum silicate having distributed thereon a mixture from about 0.01 to 0.5 % by weight each of platinum, ruthenium, rhodium and rhenium.

6. The process as defined by claim 1, wherein said catalyst has been reduced prior to being contacted with said exhaust gas.

7. The process as defined by claim 1, wherein said platinum, ruthenium, rhodium and rhenium are each present in an amount between about 0.05 and 0.2% by weight.

* * * * *